(12) United States Patent
Kai et al.

(10) Patent No.: US 7,611,164 B2
(45) Date of Patent: Nov. 3, 2009

(54) AIRBAG APPARATUS

(75) Inventors: Takeshi Kai, Saitama (JP); Takashi Aoki, Saitama (JP); Kazuhiro Onda, Saitama (JP); Rei Sakamoto, Saitama (JP); Nobuko Hashikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 11/652,313

(22) Filed: Jan. 11, 2007

(65) Prior Publication Data

US 2007/0164546 A1 Jul. 19, 2007

(30) Foreign Application Priority Data

Jan. 13, 2006 (JP) ............................ 2006-006728

(51) Int. Cl.
*B60R 21/233* (2006.01)
(52) U.S. Cl. ............... 280/729; 280/728.1; 280/730.1; 280/730.2; 280/736; 280/740; 280/742
(58) Field of Classification Search ............. 280/728.1, 280/729, 730.1, 730.2, 736, 740, 742
See application file for complete search history.

(56) References Cited

U.S. PATENT DOCUMENTS

| | | | | |
|---|---|---|---|---|
| 5,791,685 | A * | 8/1998 | Lachat et al. ............ | 280/743.1 |
| 6,378,895 | B1 * | 4/2002 | Brucker et al. .......... | 280/730.2 |
| 6,471,240 | B2 * | 10/2002 | Bakhsh et al. ........... | 280/729 |
| 6,648,368 | B2 * | 11/2003 | Smith et al. ............. | 280/730.2 |
| 6,702,320 | B1 * | 3/2004 | Lang et al. .............. | 280/729 |
| 6,877,768 | B2 * | 4/2005 | Fujiwara ................. | 280/730.2 |
| 6,883,826 | B2 * | 4/2005 | Fujiwara ................. | 280/730.2 |
| 6,916,039 | B2 * | 7/2005 | Abe ........................ | 280/729 |
| 7,264,269 | B2 * | 9/2007 | Gu et al. ................. | 280/730.2 |
| 7,316,415 | B2 * | 1/2008 | Jamison .................. | 280/729 |
| 2001/0035634 | A1 * | 11/2001 | Breed ..................... | 280/730.2 |
| 2003/0160433 | A1 * | 8/2003 | Kumagai et al. ......... | 280/729 |
| 2003/0168836 | A1 * | 9/2003 | Sato et al. ............... | 280/730.2 |
| 2004/0021304 | A1 * | 2/2004 | Tanase et al. ............ | 280/729 |
| 2004/0119269 | A1 * | 6/2004 | Yokota et al. ............ | 280/730.2 |
| 2004/0130127 | A1 * | 7/2004 | Kurimoto et al. ........ | 280/729 |
| 2004/0145162 | A1 * | 7/2004 | Abe et al. ................ | 280/729 |
| 2005/0098985 | A1 * | 5/2005 | Sullivan et al. .......... | 280/729 |
| 2005/0104342 | A1 * | 5/2005 | Jackson et al. .......... | 280/730.2 |
| 2005/0110248 | A1 * | 5/2005 | Kai ......................... | 280/729 |
| 2005/0184493 | A1 * | 8/2005 | Hofmann et al. ........ | 280/730.2 |

(Continued)

FOREIGN PATENT DOCUMENTS

JP 2003-237519 8/2003

*Primary Examiner*—Paul N. Dickson
*Assistant Examiner*—Barry Gooden, Jr.
(74) *Attorney, Agent, or Firm*—Carrier, Blackman & Associates, P.C.; Wiliam D. Blackman; Joseph P. Carrier

(57) ABSTRACT

An airbag apparatus comprising an airbag that expands between a vehicle occupant and a side wall of a vehicle body. The airbag is divided into a plurality of expanding chambers that are connected by a plurality of gas flow channels. Among the expanding chambers, the cross-sectional area of the gas flow channel leading to the expanding chamber that expands first is the largest, the cross-sectional area of the gas flow channel leading to the expanding chamber that expands last is the smallest, and the expanding chambers expand in stages.

10 Claims, 10 Drawing Sheets

U.S. PATENT DOCUMENTS

| | | | |
|---|---|---|---|
| 2005/0189742 A1* | 9/2005 | Kumagai et al. | 280/730.2 |
| 2005/0248132 A1* | 11/2005 | Wheelwright | 280/729 |
| 2006/0022439 A1* | 2/2006 | Bayley et al. | 280/729 |
| 2006/0043702 A1* | 3/2006 | Jamison | 280/729 |
| 2006/0103119 A1* | 5/2006 | Kurimoto et al. | 280/730.2 |
| 2006/0131847 A1* | 6/2006 | Sato et al. | 280/730.2 |
| 2006/0157958 A1* | 7/2006 | Heudorfer et al. | 280/730.2 |
| 2007/0126220 A1* | 6/2007 | Huber et al. | 280/740 |
| 2007/0200327 A1* | 8/2007 | Kloss et al. | 280/740 |
| 2007/0267851 A1* | 11/2007 | Svenbrant et al. | 280/729 |

* cited by examiner

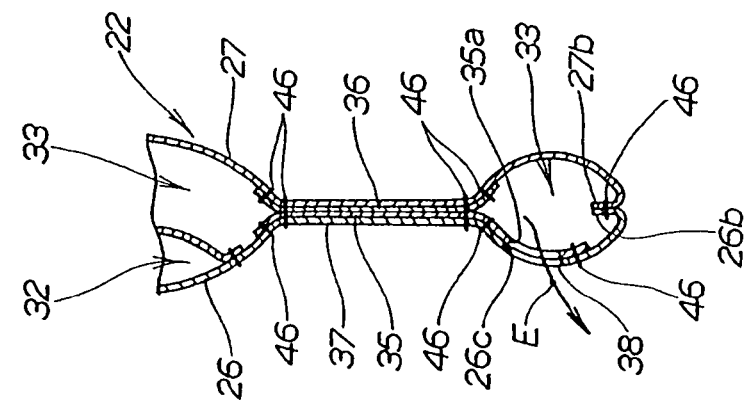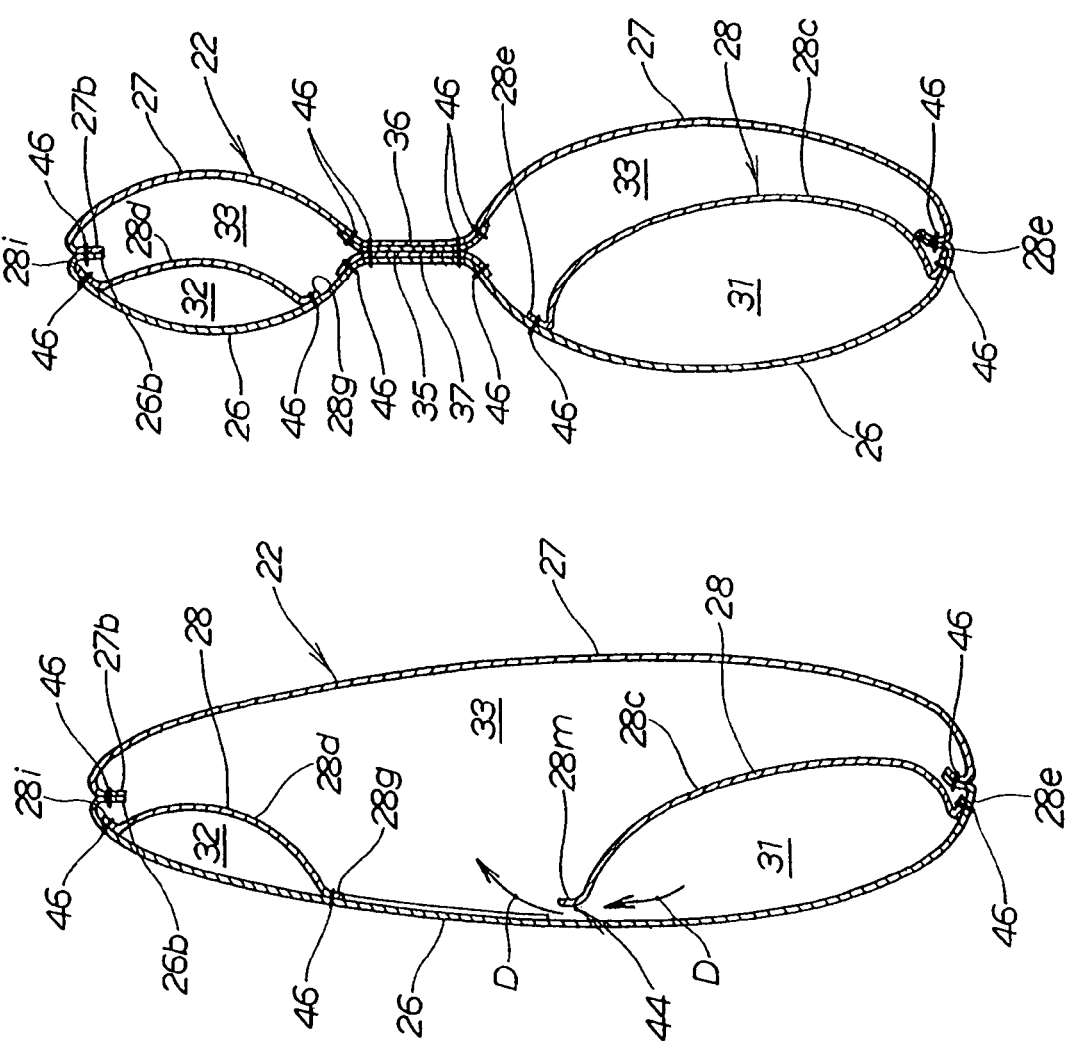

AIRBAG APPARATUS

FIELD OF THE INVENTION

The present invention relates to an airbag apparatus for filling an airbag with gas and having the filling gas cause the airbag to expand between a vehicle body and a vehicle occupant.

BACKGROUND OF THE INVENTION

A side airbag apparatus is disclosed in JP-A-2003-237519, wherein a folded airbag is accommodated within a seat back and caused to expand between a vehicle occupant and a side part of a vehicle body to protect the vehicle occupant when a side part of the vehicle receives an impact.

In the side airbag apparatus, three dividing walls are formed in an airbag, and three flow channels are formed by the dividing walls in the airbag.

The three flow channels are thus formed in the airbag. When gas is discharged from an inflator, the flow of the discharged gas is controlled by the flow channels, whereby the gas is efficiently guided throughout the entire body of the airbag, and the entire body of the airbag is caused to expand quickly.

In the conventional airbag thus arranged, the entire body of the airbag is quickly expanded. The expansion is therefore not performed in accordance with the importance of any particular body part of the vehicle occupant. For this reason, airbags have scope for improvement to allow better protection to the vehicle occupant.

It should also be noted that in order for airbags to expand quickly, a relatively large amount of gas should be filled into the airbags. This requires associated inflators to discharge a relatively large amount of gas, thus presenting a bar to the downsizing of such inflators.

More specifically, for appropriately protecting a vehicle occupant, excessive filling of gas into an airbag must be avoided. For this reason, airbags usually have a vent hole for discharging gas upon deployment of the airbags. Such a vent hole also releases gas while the airbags are being deployed. This requires the inflators to discharge a relatively large amount of gas. This makes it difficult to downsize the inflators.

SUMMARY OF THE INVENTION

It is therefore an object of the present invention to provide an airbag apparatus which is downsized and light in weight and can still offer appropriate protection for vehicle occupants.

According to an aspect of the present invention, an airbag apparatus is provided which comprises: an inflator for discharging gas; and an airbag that is caused to expand by being filled with the gas, wherein the interior of the airbag is divided into a plurality of expanding chambers, the expanding chambers have flow channels for guiding gas to the expanding chambers, and the cross-sectional area of each of the gas flow channels is different so that the expanding chambers are caused to expand in stages at different times.

Vehicle occupants have a variety of body shapes and body types. The airbag apparatus of the present invention constrains body parts of the vehicle occupant in stages and absorbs impact in order to efficiently protect vehicle occupants with respect to their different body shapes and body types. For example, the vehicle occupant can be restrained from the lumbar region.

As has been described above, in the present invention, the airbag is divided into a plurality of expanding chambers that are caused to expand in stages at different times. Accordingly, one of the expanding chambers faces the lower back of the vehicle occupant, and this chamber expands first. When a vehicle receives an impact, the chamber accordingly expands and restrains the lower back of the vehicle occupant immediately after the impact is generated. The other expanding chambers then expand in stages in a series, whereby other body parts of the vehicle occupant are restrained. Therefore, the airbag can be expanded in accordance with the level of importance of the body parts of the vehicle occupant, and the vehicle occupant can more suitably be protected.

In addition, the expanding chambers are caused to expand in stages at different times, whereby the airbag can be quickly expanded by a relatively small amount of gas. Namely, in the airbag with the divided expanding chambers communicating with each other via the gas flow channels, the gas flow channels provide resistance to the flow of gas because they are smaller than the expanding chambers. This makes it possible for the expanding chambers to fully expand one after another in stages at different times and for the gas to eventually discharge from an exhaust hole. As a result, it becomes possible to make the chambers expand without discharging gas uselessly. Therefore, advantages are presented in that the inflator can be compact, and the airbag apparatus can be made smaller and lighter.

Preferably, the airbag is deployed between a side wall of the vehicle body and a side of the vehicle occupant extending from the lumbar region to the shoulder region.

"Sides of the vehicle occupant" refers to the right and left lumbar regions (referred to as the "lumbar region" hereunder) and the right and left shoulder regions (referred to as the "shoulder region" hereunder). These body parts face inside the side wall of the vehicle body when the vehicle occupant is sitting in the seat. For this reason, when the side wall of the vehicle body receives an impact, the lumbar and shoulder regions are restrained in a preferred order, and the vehicle occupant can more suitably be protected from the impact.

Desirably, the airbag expands starting from the lowest of the expanding chambers. The lowest expanding chamber expands at a position that faces the lumbar region of the vehicle occupant. In other words, the lumbar region of the vehicle occupant is restrained first, and the back and other body parts are restrained in stages thereafter. Accordingly, the impact on the lumbar region and back of the vehicle occupant can be matched to the positions of the expanding chambers and adjusted. The vehicle occupant can therefore be more suitably protected.

According to another aspect of the present invention, an airbag apparatus is provided which comprises: an inflator for discharging gas; and an airbag that is filled with the gas and is thereby caused to expand between a side wall of a vehicle body and a side part of a vehicle occupant that extends from a lumbar region to a shoulder region, wherein the airbag is divided into a plurality of expanding chambers, the expanding chambers are connected by gas flow channels, and a design is employed whereby the cross-sectional area of the gas flow channel of the expanding chamber that expands first among the expanding chambers is the largest, and the cross-sectional areas of the gas flow channels of the expanding chamber that expands last are the smallest.

Preferably, the expanding chamber that expands first is disposed at a position that corresponds to the position of the lumbar region of the vehicle occupant.

Desirably, the expanding chamber that expands first is proximal to the vehicle side wall.

In a preferred form, the expanding chamber that expands last has an exhaust hole for discharging the gas contained therein to the exterior. Excessive expansion is prevented and the vehicle occupant can more suitably be protected.

The airbag may comprise a pouch composed of a vehicle body-side base cloth and a vehicle occupant-side base cloth, and a dividing base cloth for dividing the interior of the pouch into a plurality of expanding chambers.

Preferably, the airbag has a first expanding chamber and a second expanding chamber that are formed by the vehicle body-side base cloth and the dividing base cloth, and a third expanding chamber formed by the vehicle occupant-side base cloth and the dividing base cloth; and the first expanding chamber, second expanding chamber, and third expanding chamber are caused to expand in the stated order in stages by the gas from the inflator.

The inflator may be mounted between base end parts of the vehicle body-side base cloth and dividing base cloth; and the airbag has a first flow channel for guiding gas from the inflator to the first expanding chamber, a second flow channel for guiding gas from the inflator to the second expanding chamber, a third flow channel for guiding gas from the second expanding chamber to the third expanding chamber, and a fourth flow channel for guiding gas from the first expanding chamber to the third expanding chamber.

Preferably, the cross-sectional areas of the first flow channel, second flow channel, third flow channel, and fourth flow channel become progressively smaller in the stated order. Therefore, the airbag expands in stages in the order of the first expanding chamber, second expanding chamber, and third expanding chamber.

The cross-sectional area of the second flow channel is preferably greater than the sum of the cross-sectional area of the third flow channel and the cross-sectional area of the fourth flow channel. Therefore, the third expanding chamber will not expand before the second expanding chamber.

Preferably, the third flow channel is oriented toward a substantially central portion of the third expanding chamber, and the gas is supplied from the substantially central portion of the third expanding chamber.

BRIEF DESCRIPTION OF THE DRAWINGS

Certain preferred embodiments of the present invention shall be described in detail below, by way of example only, with reference to the accompanying drawings, in which:

FIG. 4 is a cross-sectional view taken along line 4-4 of FIG. 2;

FIG. 5 is a cross-sectional view taken along line 5-5 of FIG. 2;

FIG. 6 is a cross-sectional view taken along line 6-6 of FIG. 2;

DESCRIPTION OF THE PREFERRED EMBODIMENTS

A side airbag apparatus is given as an example to describe the airbag apparatus of the present invention. However, the present invention is not limited only to side airbag apparatuses, and includes other airbag apparatuses used in vehicles.

FIGS. 1 through 6 show the side airbag apparatus of the first embodiment.

Figure 1:
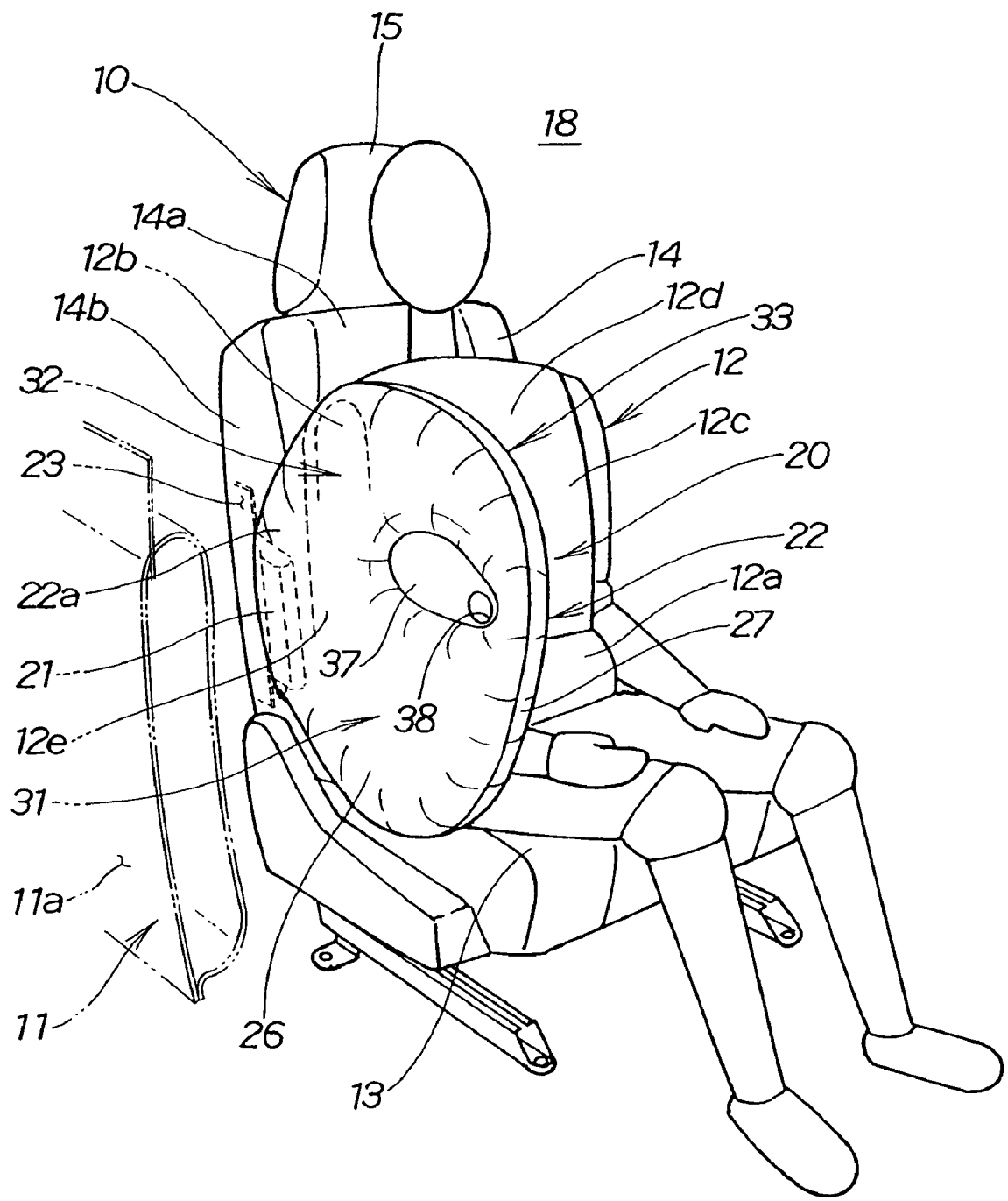
FIG. 1 is a perspective view showing a seat for a vehicle comprising an airbag apparatus of a first embodiment.

In FIG. 1, a vehicle seat 10 is disposed at a predetermined distance from the interior side of a side door 11a provided to a side of a vehicle and comprises a seat cushion 13 on which a vehicle occupant 12 sits; a seat back 14 provided to the rear of the seat cushion 13; and a head rest 15 provided to a top end 14a of the seat back 14. The side door 1 1a is included in a vehicle body 11.

A side airbag apparatus 20 is accommodated within a right side part 14b of the seat back 14 and is provided to a vehicle interior 18.

An inflator 21 is accommodated within the right side 14b of the seat back 14. A rear end 22a of the airbag 22 is mounted on the inflator 21.

The inflator 21 is mounted on the right side 14b of the seat back 14 via a mounting bracket 23, and is disposed facing a vertical direction along the right side 14b of the seatback 14.

According to the side airbag apparatus 20, gas is discharged from the inflator 21 when an impact to the side part of the vehicle is detected. The gas discharged from the inflator 21 fills the airbag 22, which is composed of a pouch. The filling gas causes the airbag 22 to expand between the side door 11a and the vehicle occupant 12, and the vehicle occupant is protected.

Figure 2:
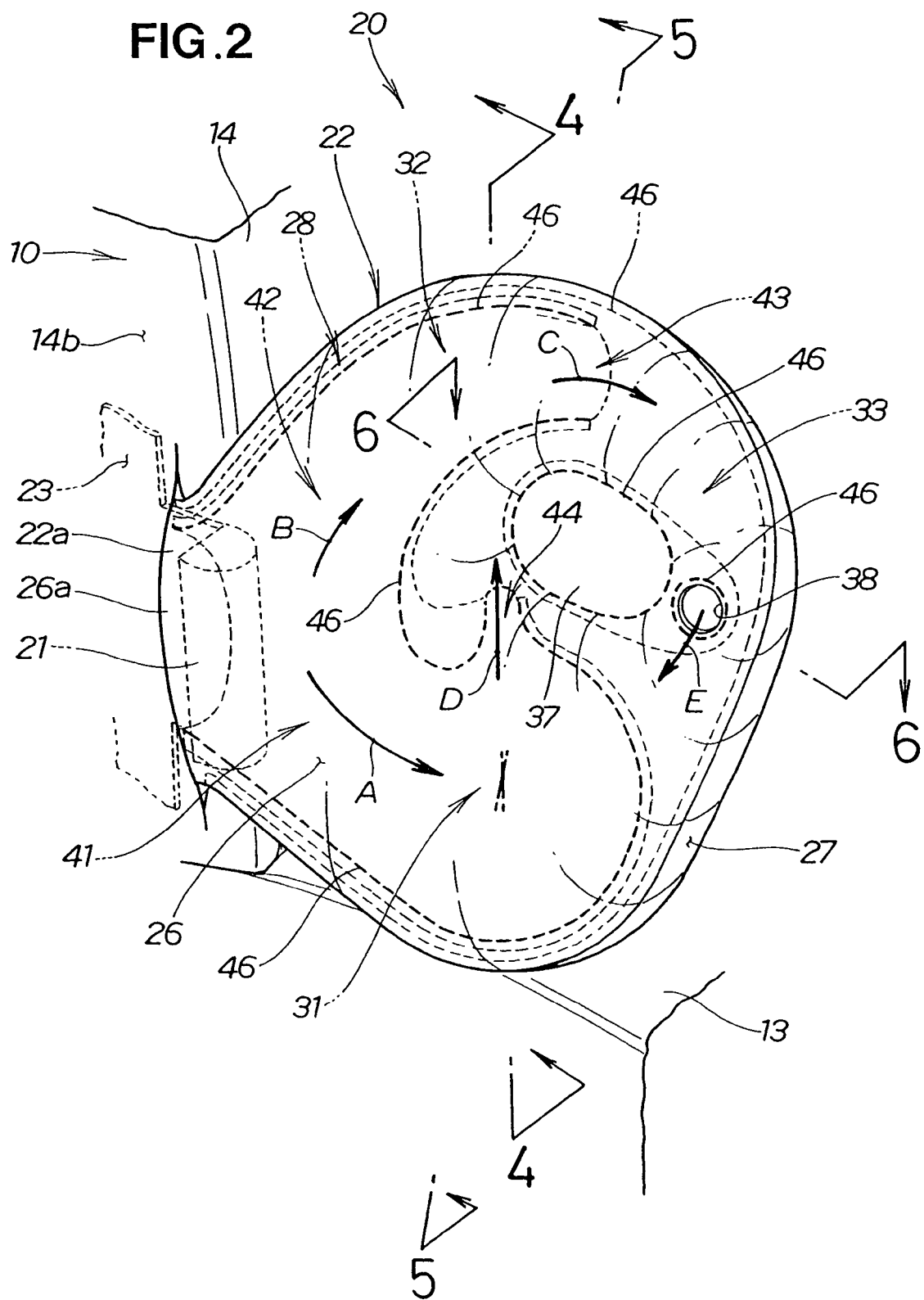
FIG. 2 is a perspective view showing the airbag apparatus shown in FIG. 1 in an expanded state.
Figure 3:
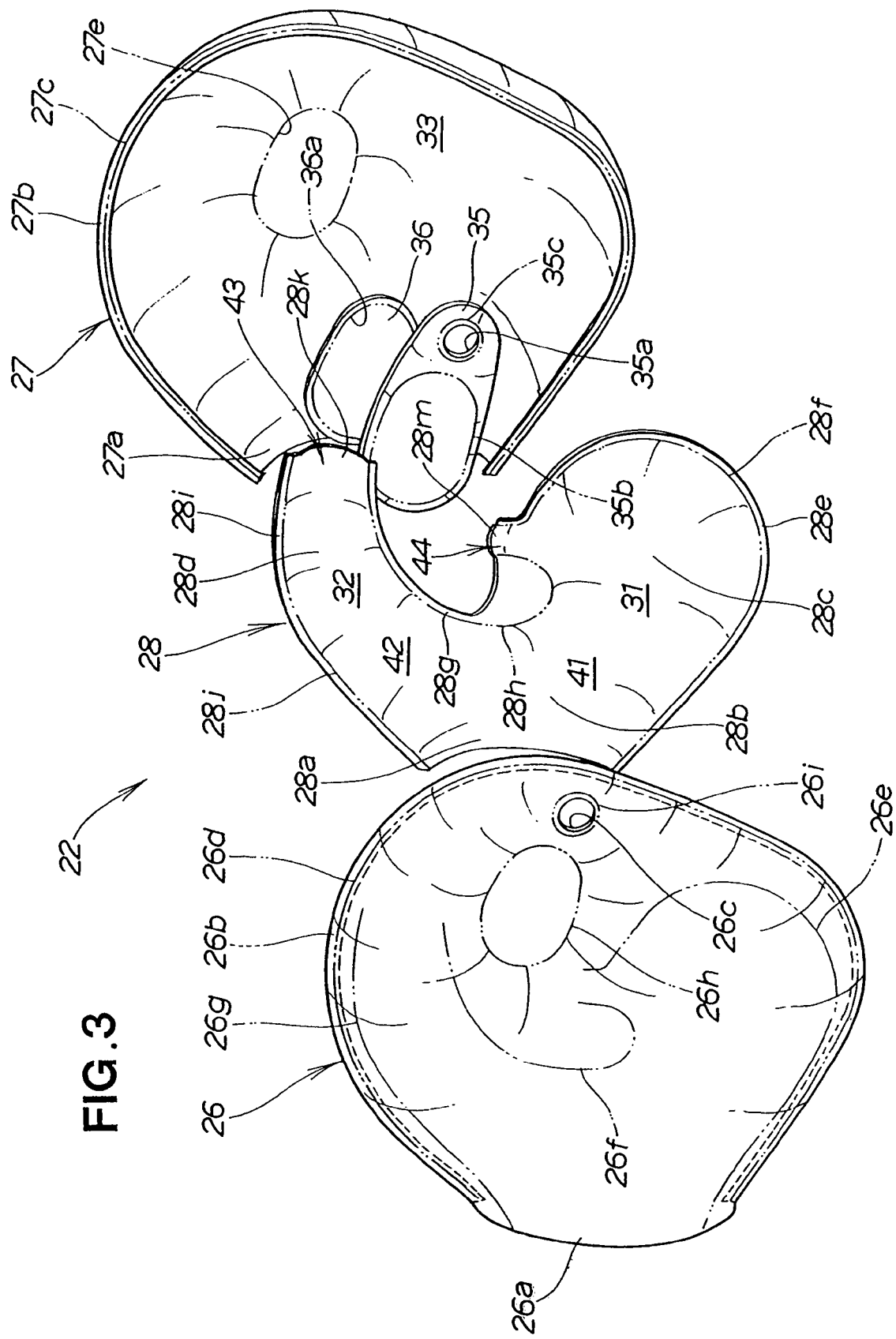
FIG. 3 is an oblique exploded view of the airbag apparatus shown in FIG. 2.

In FIGS. 2 and 3, the airbag 22 is composed of a vehicle body-side base cloth 26 positioned on the side door 11a (FIG. 1), a vehicle occupant-side base cloth 27 positioned on the side of the vehicle occupant 12, and a dividing base cloth 28 positioned between the other base cloths 26, 27.

The vehicle body-side base cloth 26 and vehicle occupant-side base cloth 27 are sewn together to form the pouch. In the interior of the pouch, the dividing base cloth 28 is sewn to the vehicle body-side base cloth 26, and the pouch is divided into first, second, and third expanding chambers 31, 32, 33 (see also FIG. 4). A pair of reinforcing cloths 35, 36 is interposed between the vehicle-side base cloth 26 and the vehicle occupant-side base cloth 27, and the cloths 35, 36, 26, 27 are sewn together in a layered state to form a non-expanding part 37.

The first, second, and third expanding chambers 31, 32, 33 are caused to expand by the gas discharged from the inflator 21. The first expanding chamber 31 is positioned lowermost among the first, second, and third expanding chambers 31, 32, 33.

The vehicle body-side base cloth 26 has a mounting part 26a at the rear end, a bending edge 26b formed at the outer periphery except for on the mounting part 26a, and an opening 26c at the front end for an exhaust hole. The mounting part 26a is a region for mounting the inflator 21.

The vehicle occupant-side base cloth 27 has a mounting part 27a at the rear end and a bending edge 27b formed on the outer periphery except for on the mounting part 27a. The mounting part 27a is a region for mounting the inflator 21.

The bending edge 26b of the vehicle body-side base cloth 26 and the bending edge 27b of the vehicle occupant-side base cloth 27 are brought together in a layered manner, and stitching areas (regions indicated by the imaginary line) 26d, 27c of each of the edges are sewn together using a stitching thread 46 to form a pouch.

The dividing base cloth 28 has a mounting part 28a at the rear end, a base part 28b at the side of the mounting part 28a facing the front of the vehicle body, a first branching part 28c extending downward from the base part 28b toward the front of the vehicle body, and a second branching part 28d above the first branching part 28c extending upward from the base part 28b toward the front of the vehicle body. The mounting part 28a is a region for mounting the inflator 21.

The inflator 21 is disposed between the mounting part 28a of the dividing base cloth 28 and the mounting part 26a of the vehicle body-side base cloth 26. The members are sewn together with the mounting part 27a of the vehicle occupant-side base cloth 27 overlapping the mounting part 28a of the dividing base cloth 28.

The inflator 21 is thereby accommodated in the rear end 22a of the air bag 22.

A lower outer periphery 28e of the dividing base cloth 28 comes into contact with the vehicle body-side base cloth 26, and a stitching thread 46 is used to sew together a stitching part 28f (region indicated by the imaginary line) that corresponds to the lower outer periphery 28e and a stitching part 26e (region indicated by the imaginary line) of the vehicle body-side base cloth 26 that corresponds to the stitching part 28f.

A stitching thread 46 is used to sew together a stitching part 28h (region indicated by the imaginary line) that corresponds to a central outer periphery 28g of the dividing base cloth 28 that is narrowed in a curved shape, and a stitching part 26f (region indicated by the imaginary line) of the vehicle body-side base cloth 26 that corresponds to the stitching part 28h.

A stitching thread 46 is used to sew together a stitching part 28j (region indicated by the imaginary line) that corresponds to an upper outer periphery 28i of the dividing base cloth 28 and a stitching part 26g (region indicated by the imaginary line) of the vehicle body-side base cloth 26 that corresponds to the stitching part 28j.

The first expanding chamber 31 is formed by the first branching part 28c and the vehicle body-side base cloth 26. The first gas flow channel 41 is formed by the vehicle body-side base cloth 26 and a region on the lower side of the base part 28b. The first gas flow channel 41 connects the inflator 21 and first expanding chamber 31, and directs gas from the inflator 21 to the first expanding chamber 31 as indicated by the arrow A.

The cross-sectional size of the first gas flow channel 41 (cross-sectional area of the flow channel) is S1.

The second expanding chamber 32 is formed by the second branching part 28d and the vehicle body-side base cloth 26. The second gas flow channel 42 is formed by the vehicle body-side base cloth 26 and a region on the upper side of the base part 28b. The second gas flow channel 42 connects the inflator 21 and second expanding chamber 32, and directs gas from the inflator 21 to the second expanding chamber 32 as indicated by the arrow B.

The cross-sectional size of the second gas flow channel 42 (cross-sectional area of the flow channel) is S2.

The third expanding chamber 33 is formed by the dividing base cloth 28 and the vehicle occupant-side base cloth 27.

A region 28k in the dividing base cloth 28 between the upper outer periphery 28i and the central outer periphery 28g is not sewn together by a stitching thread 46. The third gas flow channel 43 is formed by this region 28k and the vehicle body-side base cloth 26. The third gas flow channel 43 connects the second expanding chamber 32 and the third expanding chamber 33, and directs gas in the second expanding chamber 32 to the third expanding chamber 33 as indicated by the arrow C.

The cross-sectional size of the third gas flow channel 43 (cross-sectional area of the flow channel) is S3.

A region 28m in the dividing base cloth 28 between the lower outer periphery 28e and the central outer periphery 28g is not sewn together. The fourth gas flow channel 44 is formed by this region 28m and the vehicle body-side base cloth 26. The fourth gas flow channel 44 connects the first expanding chamber 31 and third expanding chamber 33, and directs the gas in the first expanding chamber 31 to the third expanding chamber 33 as indicated by the arrow D.

The cross-sectional size of the fourth gas flow channel 44 (cross-sectional area) is S4.

The cross-sectional sizes S1 through S4 of the first through fourth gas flow channels 41 through 44 are related so that $S1 \geq S2 \geq S3 \geq S4$.

The cross-sectional area S2 of the second gas flow channel 42 and the sum of the cross-sectional area S3 of the third gas flow channel 43 and the cross-sectional area S4 of fourth gas flow channel 44 (S3+S4) are preferably related so that $S2 > (S3+S4)$.

One reinforcing cloth 35 (i.e., the cloth positioned on the vehicle body side) of the pair of reinforcing cloths 35, 36 is formed into an elliptical shape that extends in the longitudinal direction of the vehicle body, and has an opening 35a at the front end for an exhaust hole.

The other reinforcing cloth 36 (i.e., the cloth positioned on the vehicle occupant side) of the pair of reinforcing cloths 35, 36 is formed into an elliptical shape that extends in the longitudinal direction of the vehicle body.

The pair of reinforcing cloths 35, 36 is placed atop one another, and the layered pair of reinforcing cloths 35, 36 is interposed between the vehicle body-side base cloth 26 and vehicle occupant-side base cloth 27. The stitching parts 35b, 36a, 26h, 27e (regions indicated by the imaginary line) of the cloths 35, 36, 26, 27 are sewn together using a stitching thread 46 to form a non-expanding part 37.

The opening 35a of the vehicle body-side reinforcing cloth 35 and the opening 26c of the vehicle body-side base cloth 26 are brought together in a layered manner. The stitching parts 26i, 35c (regions indicated be the imaginary line) around the openings 26c, 35a are sewn together using a stitching thread 46. An exhaust hole 38 is formed by the opening 35a of the vehicle body-side reinforcing cloth 35 and the opening 26c of the vehicle body-side base cloth 26. The third expanding chamber 33 and the exterior of the airbag 22 are connected by this exhaust hole 38. The gas in the third expanding chamber 33 is discharged to the exterior of the airbag 22 via this exhaust hole 38 as indicated by the arrow E. The exhaust hole 38 is used to prevent the airbag from expanding excessively.

As has been described above, the airbag 22 is divided into first through third expanding chambers 31 through 33, and a first flow channel 41 for directing gas to the first expanding chamber 31, a second flow channel 42 for directing gas to the second expanding chamber 32, and third and fourth flow channels 43, 44 for directing gas to the third expanding chamber 33 are formed.

As has been described above, the sizes S1 through S4 of the cross sections of the first through fourth gas flow channels 41 through 44 are related so that $S1 \geqq S2 \geqq S3 \geqq S4$. Therefore, the first through third expanding chambers 31 through 33 can be caused to expand in stages at different times (in a staggered fashion). In other words, when gas is discharged from the inflator 21, the discharged gas first causes the first expanding chamber 31 to expand, and then causes the second expanding chamber 32 to expand. Lastly, some of the gas in the first and second expanding chambers 31, 32 is directed from the chambers to the third expanding chamber 33, and the third expanding chamber 33 is caused to expand. The portion of gas directed to the third expanding chamber 33 is discharged to the exterior of the airbag 22 via the exhaust hole 38. Accordingly, the airbag has a suitable gas pressure.

The cross-sectional area S2 of the second gas flow channel 42 and the sum of the cross-sectional area S3 of the third gas flow channel 43 and the cross-sectional area S4 of the fourth gas flow channel 44 (S3+S4) have a relationship such that $S2>(S3+S4)$. Accordingly, the first expanding chamber 31 expands first to restrain the lumbar region of the vehicle occupant, the second expanding chamber 32 expands next, and the third expanding chamber 33 expands last. In other words, the above conditions enable the first, second, and third expanding chambers 31 through 33 to reliably expand in stages at different times.

In the present embodiment, the cross-sectional sizes S1 to S4 of the first through fourth gas flow channels 41 to 44 are described as being related to fulfill the relation $S1 \geqq S2 \geqq S3 \geqq S4$. As long as the relation of $S2>(S3+S4)$ is fulfilled, even when S1=S2, the expanding chambers as a whole expand in stages at different times because, although the first and second expanding chambers 31, 32 expand substantially simultaneously, the third expanding chamber 33 expand in a delayed manner.

The flow of gas when the first through third expanding chambers 31 through 33 expand is described in detail in FIGS. 7 through 12.

In FIG. 1, when the vehicle occupant 12 is seated in the vehicle seat 10, the right side of their lumbar region 12a and the right shoulder 12b face the side door 11a. For this reason, when the side door 11a receives an impact, the right side of the lumbar region 12a and the right shoulder 12b must be protected from the impact.

Therefore, the expanded airbag 22 is caused to expand between the side door 11a and the vehicle occupant 12, and the right side (side) 12e of the vehicle occupant 12 is protected.

In other words, the first expanding chamber 31 of the expanded airbag 22 is situated in a position toward the side door 11a that corresponds to the position of the right side of the lumbar region 12a of the vehicle occupant 12; the second expanding chamber 32 is situated in a position toward the side door 11a that corresponds to the position of the right shoulder 12b of the vehicle occupant 12; and the third expanding chamber 33 is in contact with the right side 12e of the upper body 12c, which extends from the lumbar region 12a of the vehicle occupant 12 to the right shoulder 12b.

FIGS. 4, 5, and 6 show cross sections of parts of the airbag 22 shown in FIG. 2.

In the airbag 22, the bending edge 26b of the vehicle body-side base cloth 26 and the bending edge 27b of the vehicle occupant-side base cloth 27 are sewn together using a stitching thread 46 to form a pouch, as shown in FIG. 4.

The lower outer periphery 28e of the dividing base cloth 28, the central outer periphery 28g having a front central part that is narrowed in a curved shape, and the upper outer periphery 28i are each sewn to the vehicle body-side base cloth 26 using a stitching thread 46. The pouch of the airbag 22 is thereby divided into the first, second, and third expanding chambers 31, 32, 33. The first expanding chamber 31 and second expanding chamber 32 are formed by sandwiching the portion narrowed in a curved shape.

The non-sewn part 28m of the dividing base cloth 28 is not sewn to the vehicle body-side base cloth 26. The fourth gas flow channel 44 is formed by this non-sewn part 28m and the vehicle body-side base cloth 26. The fourth gas flow channel 44 directs the gas in the first expanding chamber 31 to the third expanding chamber 33 as indicated by the arrow D.

The first expanding chamber 31 is placed nearer to the side door 11a (FIG. 1) than the third expanding chamber 33, with the side door 11a being a side wall of the vehicle body. When the vehicle body receives an impact, primarily, the severity of direct impact from the vehicle body is reduced.

The pair of reinforcing cloths 35, 36 are interposed in a layered state between the vehicle body-side base cloth 26 and vehicle occupant-side base cloth 27; and a stitching thread 46 is used to sew the pair of reinforcing cloths 35, 36 to the vehicle body-side base cloth 26 and vehicle occupant-side base cloth 27, respectively, as shown in FIG. 5. The non-expanding part 37 is formed by the pair of reinforcing cloths 35, 36, the vehicle body-side base cloth 26, and the vehicle occupant-side base cloth 27. The non-expanding part 37 is formed to prevent the airbag 22 from expanding to a round shape, and to make the entire body of the airbag 22 expand to a flat shape.

The opening 35a formed on the reinforcing cloth 35 and the opening 26c of the vehicle body-side base cloth 26 are brought together in a layered manner, as shown in FIG. 6. The reinforcing cloths 35, 26 are sewn together using a stitching thread 46 and the exhaust hole 38 is formed by the opening parts 35a, 26c. The gas in the third expanding chamber 33 passes through the exhaust hole 38 and is discharged to the exterior of the airbag 22 as indicated by the arrow E via this exhaust hole 38.

An example in which the airbag 22 of the side airbag apparatus 20 expands shall be described next with reference to FIGS. 7 to 12.

Figure 7:
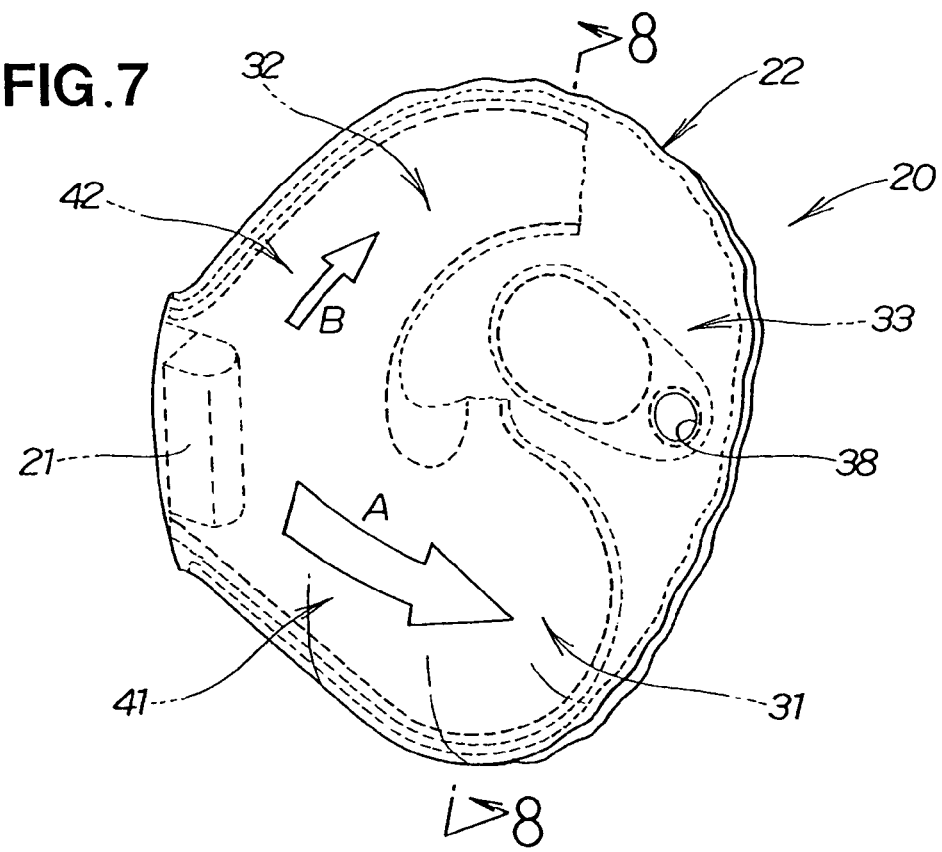
FIG. 7 is a schematic view showing a first expanding chamber of the airbag shown in FIG. 2 in an expanded state.

In FIG. 7, gas is discharged from the inflator 21. The discharged gas is directed to the first expanding chamber 31 via the first gas flow channel 41 as indicated by the arrow A, and is directed to the second expanding chamber 32 via the second gas flow channel 42 as indicated by the arrow B.

The relationship between the cross-sectional area S1 of the first gas flow channel 41 and the cross-sectional area S2 of the second gas flow channel 42 is established so that $S1 \geqq S2$. The first gas flow channel 41 is disposed at a position to which gas is more evenly directed when compared with the second gas flow channel 42. Therefore, a larger amount of gas is directed to the first expanding chamber 31 than to the second expanding chamber 32.

Figure 8:
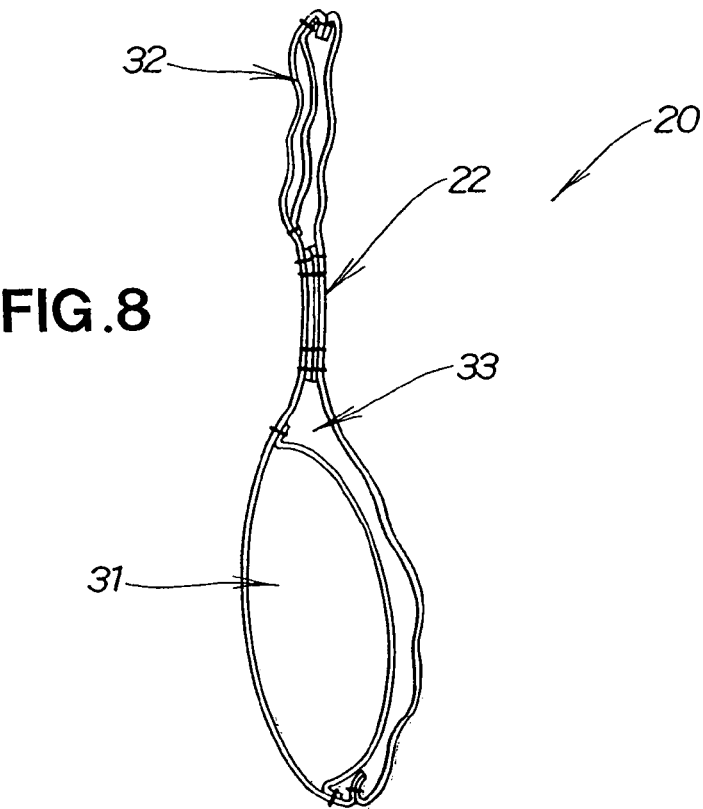
FIG. 8 is a schematic cross sectional view taken along line 7-7 of FIG. 7.
Figure 9:
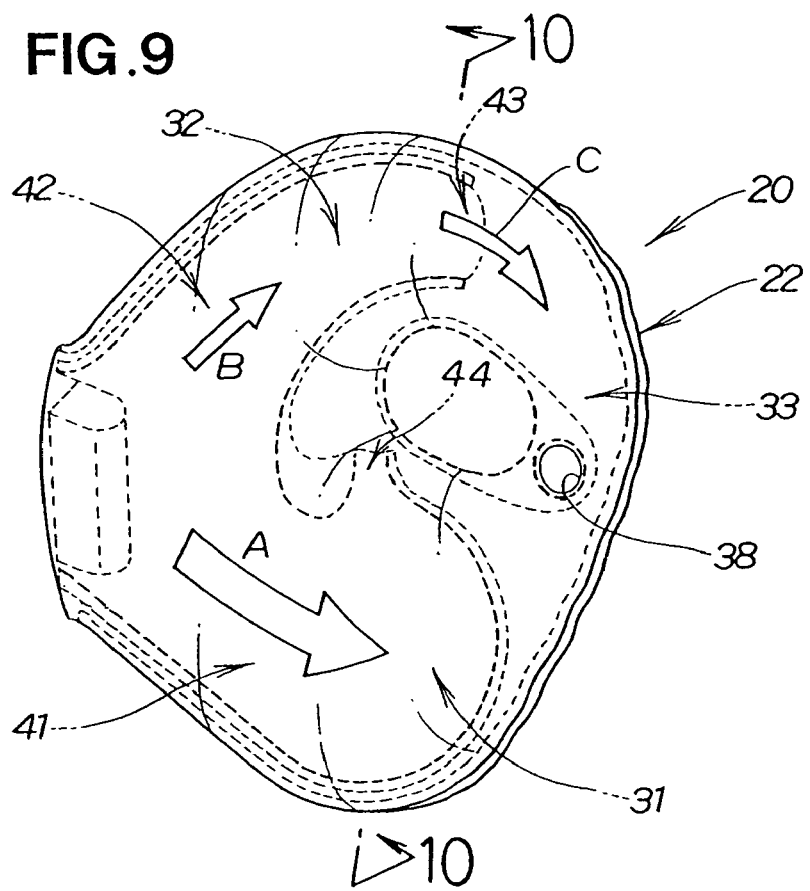
FIG. 9 is a schematic view showing a second expanding chamber of the airbag shown in FIG. 2 in an expanded state.

In FIG. 8, a larger amount of gas is directed to the first expanding chamber 31 than to the second expanding chamber 32, whereby the first expanding chamber 31 is sufficiently filled with gas first. Accordingly, the first expanding chamber 31 expands before the second expanding chamber 32. The first expanding chamber 31 expands to the position shown in FIG. 1 at the right side of the lumbar region 12a of the vehicle occupant 12.

Thus, the airbag 22 is divided into the first through third expanding chambers 31 through 33, and only the first expanding chamber is caused to expand early. Accordingly, the first expanding chamber 31 can be caused to quickly expand using a relatively small amount of gas immediately after an impact is generated. Therefore, the inflator 21 can be compact.

A description is provided hereunder with reference to FIG. 1 in regard to the reason for positioning the lowest first expanding chamber 31, which is caused to expand first and is at the lowest position, so as to correspond to the lumbar region 12a of the vehicle occupant 12.

Vehicle occupants 12 have a variety of body shapes and body types. The body parts of each of the vehicle occupants 12 are restrained in stages and to absorb an impact in order to efficiently protect each of the vehicle occupants 12 with respect to their different body shapes and body types. In other words, the lumbar region 12a is restrained first, and the right shoulder 12b and other body parts are then restrained in stages.

Thus, the chest 12d of the vehicle occupant 12 is to the side of the right shoulder 12b, and the impact is transmitted from the right shoulder 12b to the chest 12d. Accordingly, the impact on the lumbar region 12a, right shoulder 12b, and chest 12d of the vehicle occupant 12 can be adjusted in accordance with the position of the body parts, and the vehicle occupant can therefore more suitably be protected.

The relationship between the cross-sectional area S3 of the third gas flow channel 43 and the cross-sectional area S4 of the fourth gas flow channel 44 is set so that S3≧S4. The third gas flow channel 43 is disposed at a position to which gas is more smoothly directed when compared with the fourth gas flow channel 44. Accordingly, some of the gas directed to the second expanding chamber 32 is directed to the third expanding chamber 33 via the third gas flow channel 43 as indicated by the arrow C. In this state, the second expanding chamber 32 is sufficiently filled with gas.

Figure 10:
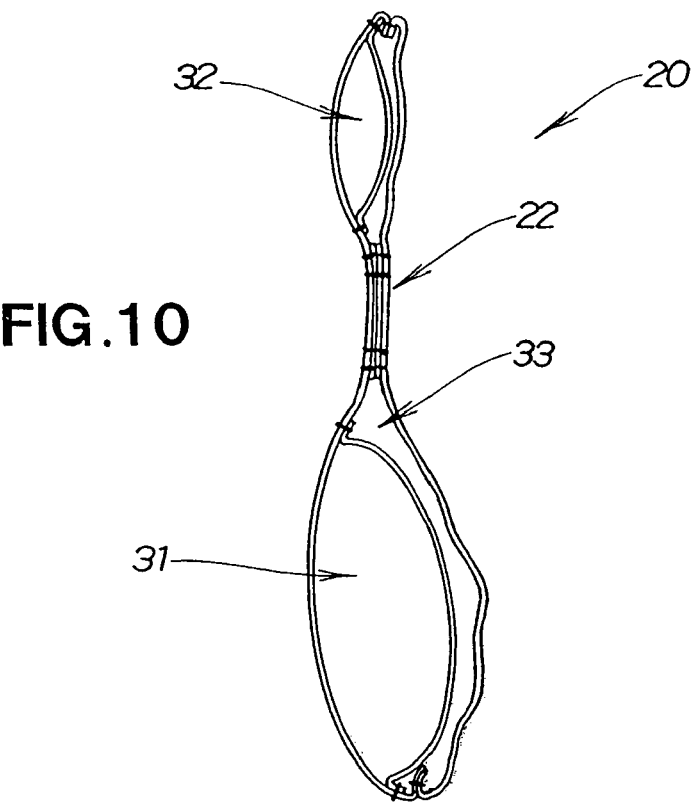
FIG. 10 is a schematic cross sectional view taken along line 10-10 of FIG. 9.

In FIG. 10, once the first expanding chamber 31 has expanded, the second expanding chamber 32 will be sufficiently filled with gas, whereby the second expanding chamber 32 expands. The second expanding chamber 32 expands at the right shoulder 12b (FIG. 1) of the vehicle occupant 12.

The timing can be staggered so that the right shoulder 12b is securely restrained by the second expanding chamber 32 after the lumbar region 12a (FIG. 1) has been restrained by the first expanding chamber 31.

Thus, the initial impact is received by the lumbar region 12a directly after being generated, whereby the impact is dispersed, and the vehicle occupant 12 can be securely restrained.

Figure 11:
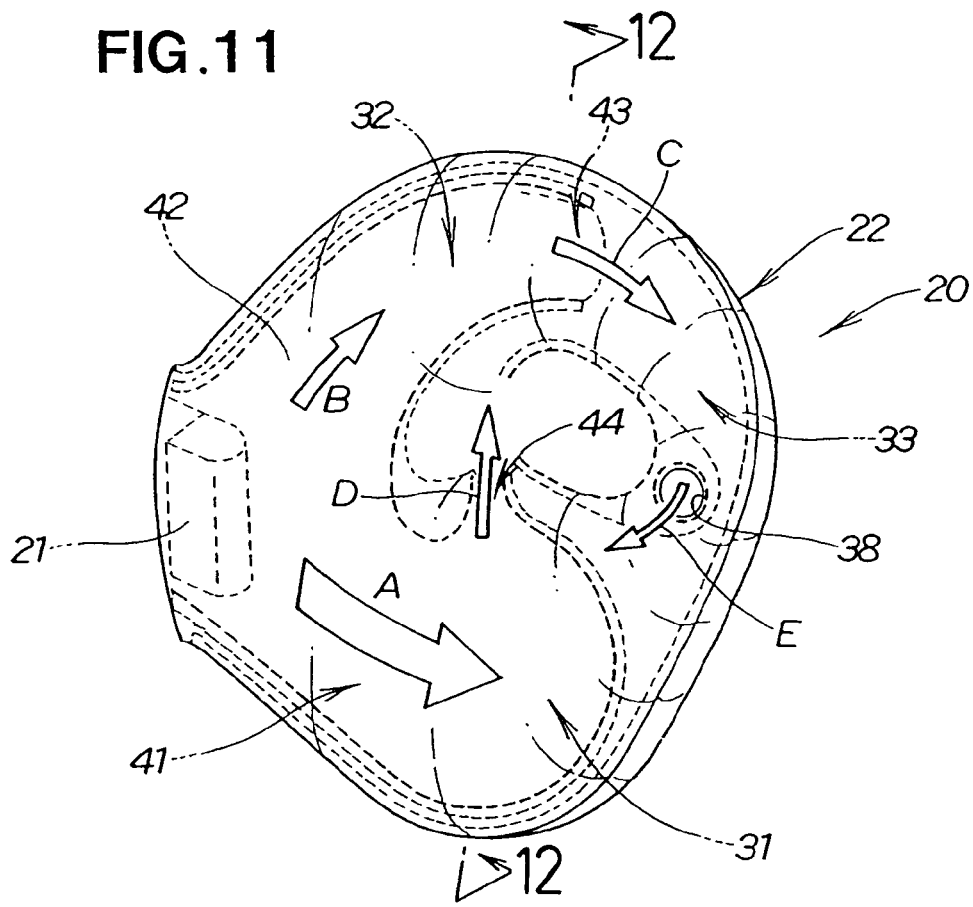
FIG. 11 is a schematic view showing a third expanding chamber of the airbag shown in FIG. 2 in an expanded state.

Next, as shown in FIG. 11, some of the gas directed to the first expanding chamber 31 is directed to the third expanding chamber 33 via the fourth gas flow channel 44 as indicated by the arrow D. In other words, some of the gas in the second expanding chamber 32 and some of the gas in the first expanding chamber 31 are directed to the third expanding chamber 33, and the third expanding chamber 33 is sufficiently filled with gas.

Figure 12:
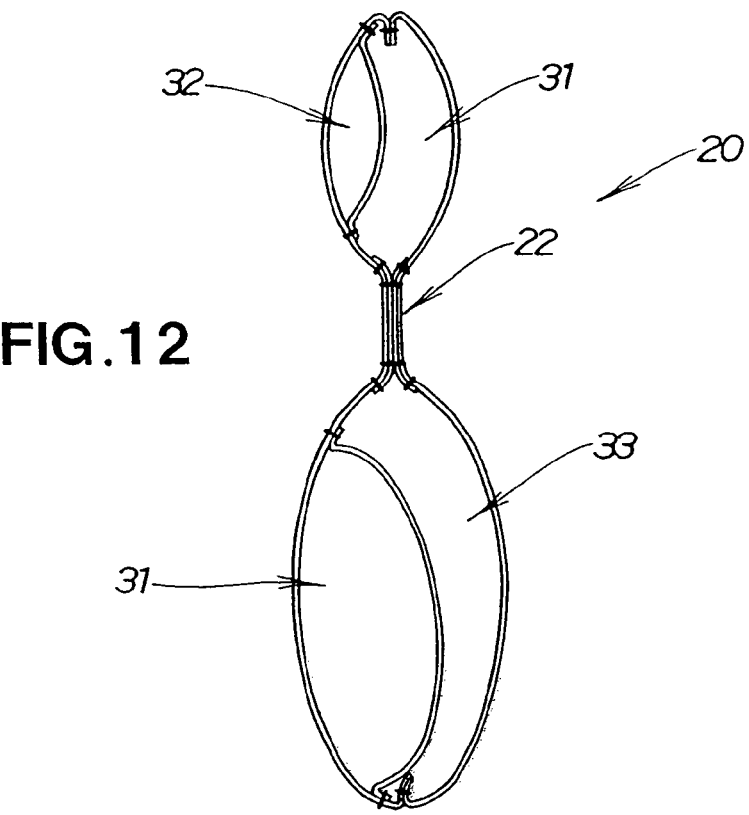
FIG. 12 is a schematic cross sectional view taken along line 12-12 of FIG. 11.

As shown in FIG. 12, the third expanding chamber 33 is sufficiently filled with gas, whereby the third expanding chamber 33 expands. The third expanding chamber 33 expands at the right side 12e of the upper body 12c of the vehicle occupant 12 shown in FIG. 1. The upper body 12c is securely restrained by the expanded third expanding chamber 33. When this occurs, the lumbar region 12a is also restrained and suitably protected by the third expanding chamber 33.

Thus, the upper body 12c is restrained by the airbag 22, whereby the upper body 12c applies pressure to the airbag 22. Accordingly, some of the gas directed to the third expanding chamber 33 is discharged to the exterior of the airbag 22 via the exhaust hole 38 as indicated by the arrow E (FIG. 11), and the vehicle occupant 12 is securely restrained by the airbag 22.

As described above, according to the side airbag apparatus 20 of the first embodiment, the airbag 22 is divided into first through third expanding chambers 31 through 33, and the expanding chambers 31 through 33 are caused to expand in stages at different times.

In other words, among the first through third expanding chambers 31 through 33, the first expanding chamber 31 faces the lumbar region 12a and is caused to expand first. Accordingly, when the vehicle body receives an impact, the first expanding chamber 31 is caused to expand immediately after the impact is generated and the lumbar region 12a can be restrained. Then, the second and third expanding chambers 32, 33 expand in stages, whereby the lumbar region 12a, right shoulder 12b, chest 12d, and stomach of the vehicle occupant 12 are restrained in stages. Thus, the first through third expanding chambers 31 through 33 are caused to expand in stages at different times starting from the important parts of the vehicle occupant 12, whereby the vehicle occupant 12 can more suitably be protected.

An airbag apparatus of a second embodiment shall next be described with reference to FIGS. 13 through 15. In the second embodiment, components that are the same as or similar to those of the side airbag apparatus 20 of the first embodiment are marked by the same symbols, and descriptions thereof are accordingly omitted.

Figure 13:
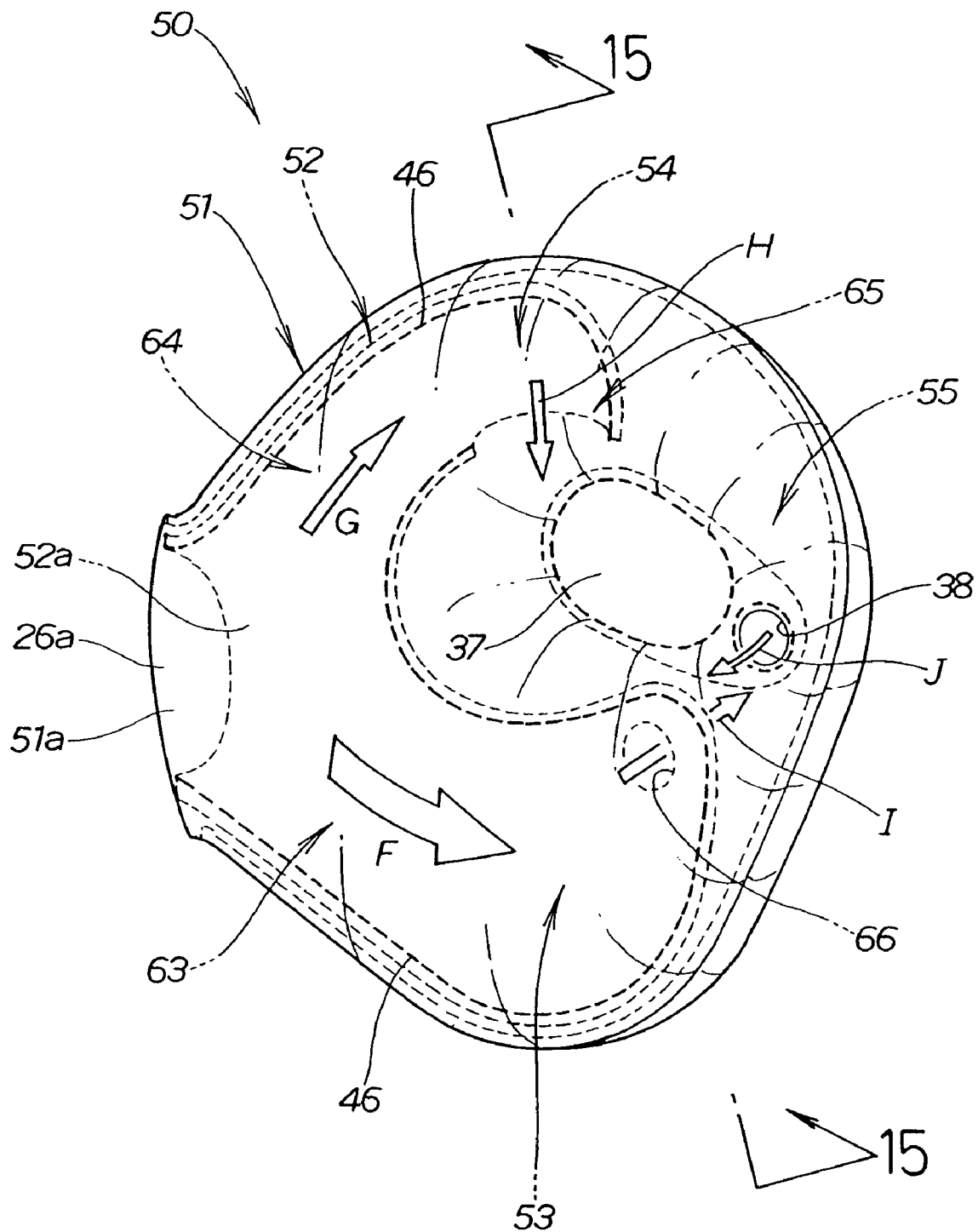
FIG. 13 is a perspective view showing an airbag of a second embodiment in an expanded state.
Figure 14:
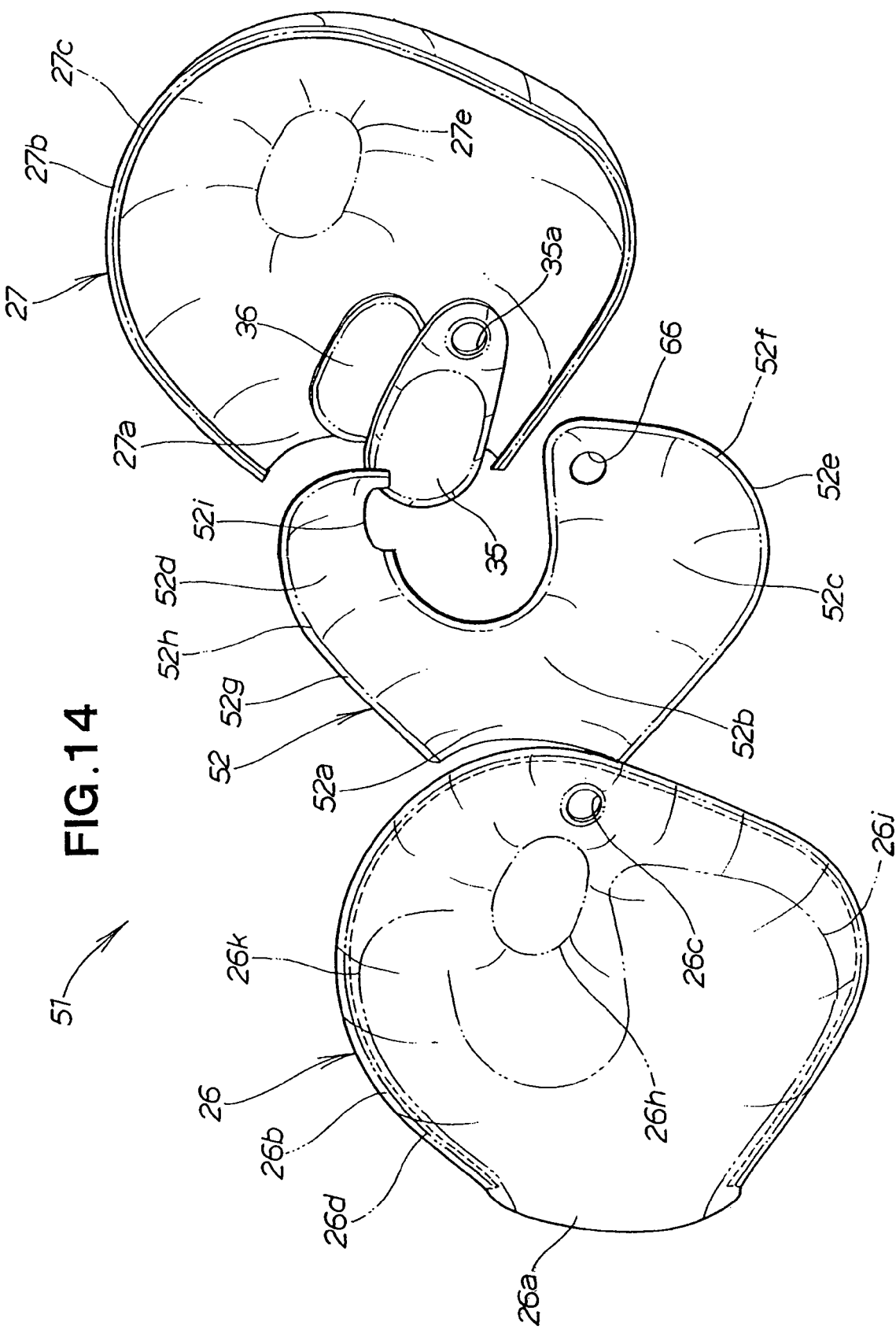
FIG. 14 is an oblique exploded view of the expanded airbag shown in FIG. 13.

In the side airbag apparatus 50 of the second embodiment, an airbag 51 of the second embodiment is used instead of the airbag 20 of the first embodiment, but is otherwise identical thereto in terms of the configuration, as shown in FIGS. 13 and 14. In the airbag 51 of the second embodiment, a dividing base cloth 52 is used instead of the dividing base cloth 28 of the airbag 22 of the first embodiment, but is otherwise identical thereto in terms of the configuration.

The dividing base cloth 52 has a mounting part 52a at the rear end, a base part 52b further along than the mounting part 52a toward the front side of the vehicle body, a first branching part 52c extending downward from the base part 52b toward the front of the vehicle body, and a second branching part 52d that lies on both sides of a front part narrowed in a curved shape and that extends upward above the first branching part 52c from the base part 52b toward the front of the vehicle body.

The mounting part 52a is a region for mounting the inflator 21 in the same manner as the mounting part 28a of the first embodiment. The base part 52b is the same region as the base part 28b of the first embodiment.

The inflator 21 (FIG. 2) is disposed between the mounting part 52a of the dividing base cloth 52 and the mounting part 26a of the vehicle body-side base cloth 26. The mounting part 27a of the vehicle occupant-side base cloth 27 is brought together with the mounting part 52a of the dividing base cloth 52 in a layered manner and sewn together in this state. The inflator 21 is thereby accommodated within a rear end 51a of the airbag 51.

A lower outer periphery 52e of the dividing base cloth 52 comes into contact with the vehicle body-side base cloth 26, and a stitching thread 46 is used to sew together stitching parts 52f, 26j (regions indicated by the imaginary line) on each.

An upper outer periphery 52g of the dividing base cloth 52 comes into contact with the vehicle body-side base cloth 26, and a stitching thread 46 is used to sew together stitching parts 52h, 26k (regions indicated by the imaginary line) on each.

A first expanding chamber 53 is formed by the first branching part 52c and vehicle body-side base cloth 26, and a first gas flow channel 63 is formed by the vehicle body-side base cloth 26 and a region on the lower side of the base part 52b. The first gas flow channel 63 connects the inflator 21 and first expanding chamber 53, and directs gas from the inflator 21 to the first expanding chamber 53 as indicated by he arrow F. The size of the cross section of the first gas flow channel 63 (cross-sectional area of the flow channel) is S5.

A second expanding chamber 54 is formed by the second branching part 52d and the vehicle body-side base cloth 26, and a second gas flow channel 64 is formed by the vehicle body-side base cloth 26 and a region on the upper side of the base part 52b. The second gas flow channel 64 connects the inflator 21 and second expanding chamber 54 and directs gas from the inflator 21 to the second expanding chamber 54 as indicated by the arrow G. The size of the cross section of the second gas flow channel 64 (cross-sectional area of the flow channel) is S6.

A third expanding chamber 55 is formed by the dividing base cloth 52 and the vehicle occupant-side base cloth 27.

Non-stitched part 52i between the lower outer periphery 52e and the upper outer periphery 52g of the dividing base cloth 52 is not sewn together using a stitching thread 46. Accordingly, the non-sewn part 52i and the vehicle body-side base cloth 26 form a third gas flow channel 65. The third gas flow channel 65 connects the second expanding chamber 54 and third expanding chamber 55, and directs some of the gas in the second expanding chamber 54 to the third expanding chamber 55 as indicated by the arrow H. The size of the cross section of the third gas flow channel 65 (cross-sectional area of the flow channel) is S7.

The dividing base cloth 52 further has a fourth gas flow channel 66 composed of an opening formed at the front end of the first branching part 52c. The fourth gas flow channel 66 connects the first expanding chamber 53 and third expanding chamber 55, and directs some of the gas in the first expanding chamber 53 to the third expanding chamber 55 as indicated by the arrow I. The size of the cross section of the fourth gas flow channel 66 (cross-sectional area) is S8.

The first through third expanding chambers 53 through 55 are caused to expand by gas discharged from the inflator 21.

The sizes S5 though S8 of the cross sections of the first through fourth gas flow channels 63 through 66 are set so as to have a relationship such that $S5 \geqq S6 \geqq S7 \geqq S8$ in the same manner as in the first embodiment.

The cross-sectional area S6 of the second gas flow channel 64 and the sum of the cross-sectional area S7 of the third gas flow channel 65 and the cross-sectional area S8 of the fourth gas flow channel 66 (S7+S8) preferably have a relationship such that $S6>(S7+S8)$.

Figure 15:
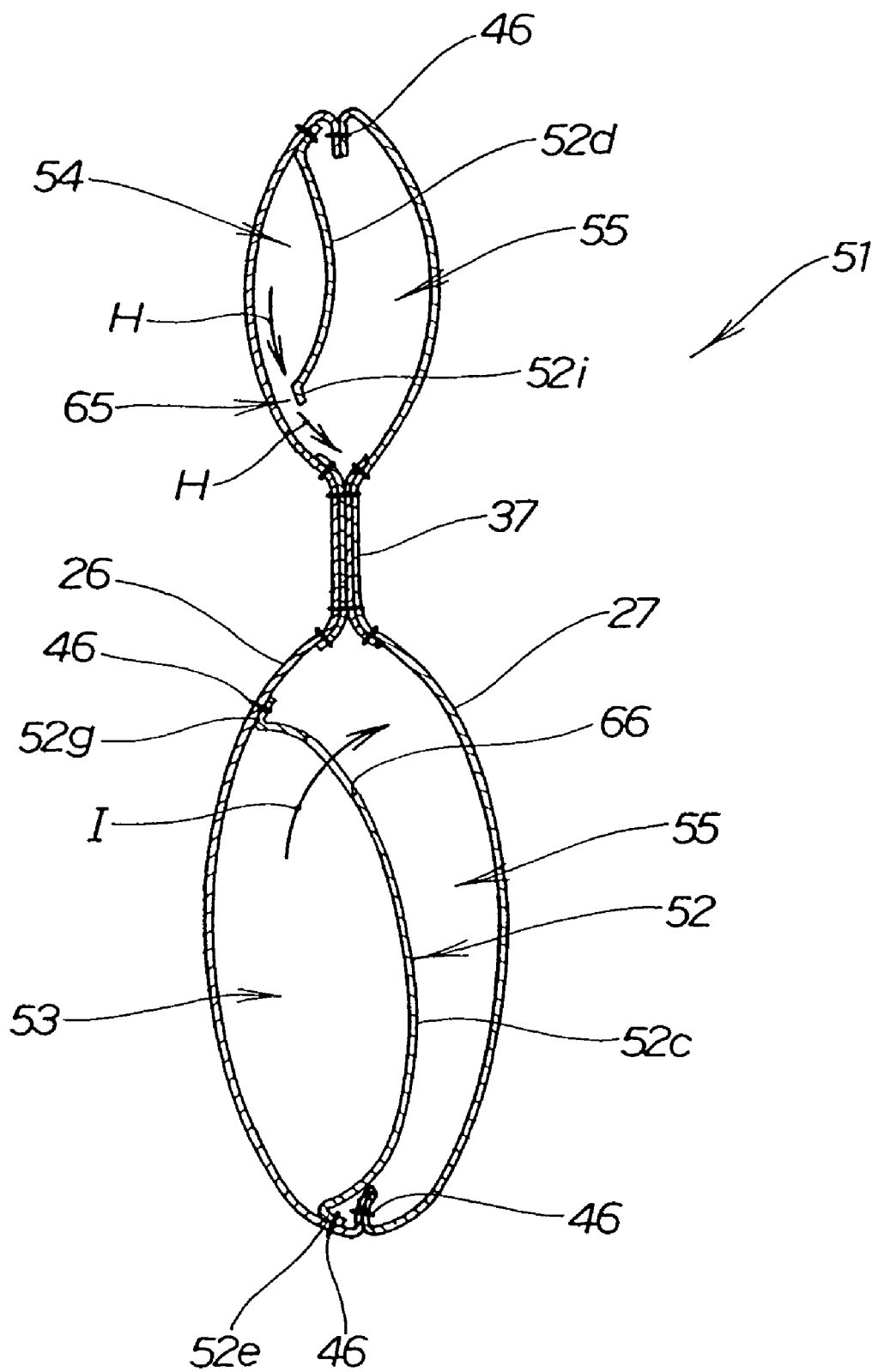
FIG. 15 is a cross-sectional view taken along line 15-15 of FIG. 13.

In the airbag 51, the vehicle body-side base cloth 26 and vehicle occupant-side base cloth 27 are sewn together using a stitching thread 46 to form a pouch, as shown in FIG. 15, in the same manner as in the first embodiment. The lower outer periphery 52e and upper outer periphery 52g of the dividing base cloth 52 are each sewn to the vehicle body-side base cloth 26 using a stitching thread 46. The pouch of the airbag 51 is thereby divided into the first through third expanding chambers 53 through 55.

In FIG. 8, gas discharged from the inflator 21 (FIG. 2) is directed to the first expanding chamber 53 via the first gas flow channel 63 as indicated by the arrow F, and is guided to the second expanding chamber 54 via the second gas flow channel 64 as indicated by the arrow G.

The relationship between the cross-sectional area S5 of the first gas flow channel 63 and the cross-sectional area S6 of the second gas flow channel 64 is set so that $S5 \geqq S6$. In addition, the first gas flow channel 63 is disposed at a position to which gas is more evenly directed when compared with the second gas flow channel 64. Accordingly, a larger amount of gas is directed to the first expanding chamber 53 than to the second expanding chamber 54.

The first expanding chamber 53 is sufficiently filled first by having a larger amount of gas directed to the first expanding chamber 53 than to the second expanding chamber 54. The first expanding chamber 53 is thereby caused to expand before the second expanding chamber 54. The expanded first expanding chamber 53 faces the right side of the lumbar region 12a of the vehicle occupant 12, shown in FIG. 1.

The relationship between the cross-sectional area S7 of the third gas flow channel 65 and the cross-sectional area S8 of the fourth gas flow channel 66 is set so that $S7 \geqq S8$. Accordingly, the amount of gas that enters the third expanding chamber 55 from the third gas flow channel 65 is greater than the amount of gas that enters the third expanding chamber 55 from the fourth gas flow channel 66, and some of the gas directed to the second expanding chamber 54 is directed to the third expanding chamber 55 via the third gas flow channel 65 as indicated by the arrow H. In this state, the second expanding chamber 54 is sufficiently filled with gas and expands. The expanded second expanding chamber 54 faces the right shoulder 12b (FIG. 1) of the vehicle occupant 12.

Some of the gas directed to the first expanding chamber 53 is directed to the third expanding chamber 55 via the fourth gas flow channel 66 as indicated by the arrow I. Accordingly, some of the gas in the second expanding chamber 54 and some of the gas in the first expanding chamber 53 are directed to the third expanding chamber 55, and the third expanding chamber 55 is sufficiently filled with gas.

The third expanding chamber 55 is sufficiently filled with gas, whereby the third expanding chamber 55 expands after the second expanding chamber 54 has expanded. The expanded third expanding chamber 55 faces the right side 12e of the upper body 12c of the vehicle occupant 12 shown in FIG. 1. The upper body 12c is securely restrained by the expanded third expanding chamber 55.

The upper body 12c is restrained by the third expanding chamber 55, whereby the upper body 12c is subjected to pressure from the third expanding chamber 55. When this occurs, the pressure on the third expanding chamber 55 suddenly increases. Therefore, some of the gas directed to the third expanding chamber 55 is discharged to the exterior of the airbag 51 via the exhaust hole 38 as indicated by the arrow J, and the vehicle occupant 12 can be securely restrained by suitable pressure from the airbag 51.

The cross-sectional area S6 of the second gas flow channel 64 and the sum of the cross-sectional area S7 of the third gas flow channel 65 and the cross-sectional area S8 of the fourth gas flow channel 66 (S7+S8) are related to each other so that $S6>(S7+S8)$. Therefore, the first expanding chamber 53 expands, the second expanding chamber 54 expands next, and the third expanding chamber 55 expands last. In other words, in the airbag 51, the expanding chambers expand in stages in the order of the first expanding chamber 53, the second expanding chamber 54, and then the third expanding chamber 55. Therefore, body parts are restrained first in the lumbar region and then the shoulders, which are important parts of the vehicle occupant, and the upper body, which extends from the lumbar region to the shoulders, is restrained last. The chest is protected somewhat by the shoulder and arms, and is therefore restrained last.

As described above, according to the side airbag apparatus 50 of the second embodiment, the same effect is obtained as with the side airbag apparatus 20 of the first embodiment.

In addition, according to the airbag 51 of the second embodiment, the third gas flow channel 65 opens from the upper part of the third expanding chamber 55 toward the center; the fourth gas flow channel 66 opens toward the inner wall of the vehicle occupant-side base cloth 27 that forms the third expanding chamber 55; and the cross-sectional area S7 of the third gas flow channel 65 is greater than the cross-sectional area of the fourth gas flow channel 66. Therefore, the entire body of the third expanding chamber 55 can be caused to expand more smoothly.

In the first and second embodiments, the description relates to side airbag apparatuses 20, 50 being provided to the right side 14b of the seat back 14. However, the present invention is not limited thereto, and the side airbag apparatuses 20, 50 can also be provided to the side of the vehicle body 11.

Discussions were made on example arrangements in which the side airbag apparatuses 20, 50 are caused to expand to the right side 12e of the vehicle occupant 12. However, the configuration is not limited thereto, and the same effect will be obtained even when a configuration is used in which the side airbag apparatuses 20, 50 are caused to expand to the left side of the vehicle occupant 12.

Furthermore, in the first and second embodiments, discussions were made on side airbag apparatuses 20, 50. However, the present invention is not limited thereto, and can be used with front airbag apparatuses and other devices for causing an airbag to expand in front of a vehicle occupant 12.

Still further, in the first and second embodiments, discussions were made on examples in which the airbag was divided into first expanding chambers 31, 53, second expanding chambers 32, 54, and third expanding chambers 33, 55, as the plurality of expanding chambers. However, the configuration is not limited thereto, and the airbag can be divided into, e.g., two or four chambers as well.

Still yet further, in the first and second embodiments, descriptions were provided of examples in which the first expanding chambers 31, 53 and second expanding chambers 32, 54 are each directly connected to the inflator 21 and the third expanding chambers 33, 55 are connected to the inflator 21 via the first expanding chambers 31, 53 and second expanding chambers 32, 54. However, the configuration is not limited thereto, and the first expanding chambers 31, 53, second expanding chambers 32, 54, and third expanding chambers 33, 55 can also all be directly connected to the inflator 21. In such instances, the sizes of the cross-sectional areas of the gas flow channels to the expanding chambers may be different.

Obviously, various minor changes and modifications of the present invention are possible in light of the above teaching. It is therefore to be understood that within the scope of the appended claims the invention may be practiced otherwise than as specifically described.

What is claimed is:

1. An airbag apparatus comprising:
an inflator for discharging gas; and
an airbag that is caused to expand by being filled with the gas, wherein:
an interior of the airbag is divided into a plurality of expanding chambers including first, second, and third expanding chambers;
the airbag has a plurality of flow channels formed therein for guiding gas to the expanding chambers, including a first flow channel for guiding gas from the inflator to the first expanding chamber, a second flow channel for guiding gas from the inflator to the second expanding chamber, a third flow channel for guiding gas from the second expanding chamber to the third expanding chamber, and a fourth flow channel for guiding gas from the first expanding chamber to the third expanding chamber; and
a cross-sectional area of each of the gas flow channels is different so that the expanding chambers are caused to expand in stages at different times.

2. The airbag apparatus of claim 1, wherein the airbag expands between a side wall of a vehicle body and a side part of a vehicle occupant region extending from a lumbar region to a shoulder region.

3. The airbag apparatus of claim 2, wherein the airbag expands starting from a lowermost expanding chamber of the expanding chambers.

4. An airbag apparatus comprising:
an inflator for discharging gas, wherein the inflator is mounted between base end parts of a vehicle body-side base cloth and a dividing base cloth; and
an airbag that is filled with the gas and is thereby caused to expand between a side wall of a vehicle body and a side part of a vehicle occupant region that extends from a lumbar region to a shoulder region,
wherein:
the airbag is divided into a plurality of expanding chambers,
the airbag comprises a pouch composed of the vehicle body-side base cloth and a vehicle occupant-side base cloth, and the dividing base cloth for dividing an interior of the pouch into said plurality of expanding chambers,
the airbag has a first expanding chamber and a second expanding chamber that are formed by the vehicle body-side base cloth and the dividing base cloth, and a third expanding chamber formed by the vehicle occupant-side base cloth and the dividing base cloth,
the first expanding chamber, second expanding chamber, and third expanding chamber are caused to expand in the stated order in stages by the gas from the inflator;
the expanding chambers are connected by gas flow channels, and the airbag has a first flow channel for guiding gas from the inflator to the first expanding chamber, a second flow channel for guiding gas from the inflator to the second expanding chamber, a third flow channel for guiding gas from the second expanding chamber to the third expanding chamber, and a fourth flow channel for guiding gas from the first expanding chamber to the third expanding chamber; and
a cross-sectional area of the gas flow channel of the expanding chamber that expands first among the expanding chambers is the largest, and the cross-sectional areas of the gas flow channels of the expanding chamber that expands last are the smallest.

5. The airbag apparatus of claim 4, wherein the expanding chamber that expands first is disposed at a position that corresponds to the position of the lumbar region of the vehicle occupant region.

6. The airbag apparatus of claim 4, wherein the expanding chamber that expands last has an exhaust hole for discharging the gas contained therein to the exterior.

7. The airbag apparatus of claim 4, wherein the expanding chamber that expands first is positioned proximal to the side wall of the vehicle body.

8. The airbag apparatus of claim 4, wherein the cross-sectional areas of the first flow channel, second flow channel, third flow channel, and fourth flow channel become progressively smaller in the stated order.

9. The airbag apparatus of claim 8, wherein the cross-sectional area of the second flow channel is greater than the sum of the cross-sectional area of the third flow channel and the cross-sectional area of the fourth flow channel.

10. The airbag apparatus of claim 4, wherein the third flow channel is oriented toward a substantially central portion of the third expanding chamber, and the gas is supplied from said second expanding chamber to said third expanding chamber via the substantially central portion of the third expanding chamber.

* * * * *